US007025700B1

(12) United States Patent
Hoelscher

(10) Patent No.: US 7,025,700 B1
(45) Date of Patent: Apr. 11, 2006

(54) CLOSED-LOOP HYDRAULIC ADJUSTABLE SLIP DIFFERENTIAL

(76) Inventor: Kurtis Rex Hoelscher, 7378 Four Turkey Rd., Celina, OH (US) 45822

(*) Notice: Subject to any disclaimer, the term of this patent is extended or adjusted under 35 U.S.C. 154(b) by 174 days.

(21) Appl. No.: 10/839,997

(22) Filed: May 6, 2004

Related U.S. Application Data

(60) Provisional application No. 60/470,930, filed on May 15, 2003, provisional application No. 60/492,487, filed on Aug. 4, 2003.

(51) Int. Cl.
*F16H 48/20* (2006.01)
(52) U.S. Cl. .............................. 475/84; 475/90; 475/89
(58) Field of Classification Search ................ 475/231, 475/223, 225, 232, 84
See application file for complete search history.

(56) References Cited

U.S. PATENT DOCUMENTS

| 3,831,461 | A | * | 8/1974 | Mueller | 475/89 |
| 4,272,993 | A | * | 6/1981 | Kopich | 475/90 |
| 4,630,505 | A | * | 12/1986 | Williamson | 475/90 |
| 5,024,634 | A | | 6/1991 | Blessing | |
| 5,232,410 | A | * | 8/1993 | Yanai | 475/84 |
| 6,505,722 | B1 | | 1/2003 | Ganthev | |

* cited by examiner

*Primary Examiner*—Charles A Marmor
*Assistant Examiner*—Justin K Holmes

(57) ABSTRACT

A vehicle differential which includes an integral positive displacement pump, along with adjustable fluid controls and a movable surface for holding fluid controls in position, infinitely from full open to full closed, where as relative rotation of differential half-axles and side gears would cause positive displacement pump to force fluid past fluid controls and position of fluid controls would restrict the fluid flow thus effectively limiting the "slip" of the differential.

10 Claims, 2 Drawing Sheets

CLOSED-LOOP HYDRAULIC ADJUSTABLE SLIP DIFFERENTIAL

CROSS-REFERENCE TO RELATED APPLICATIONS

Figure 1:
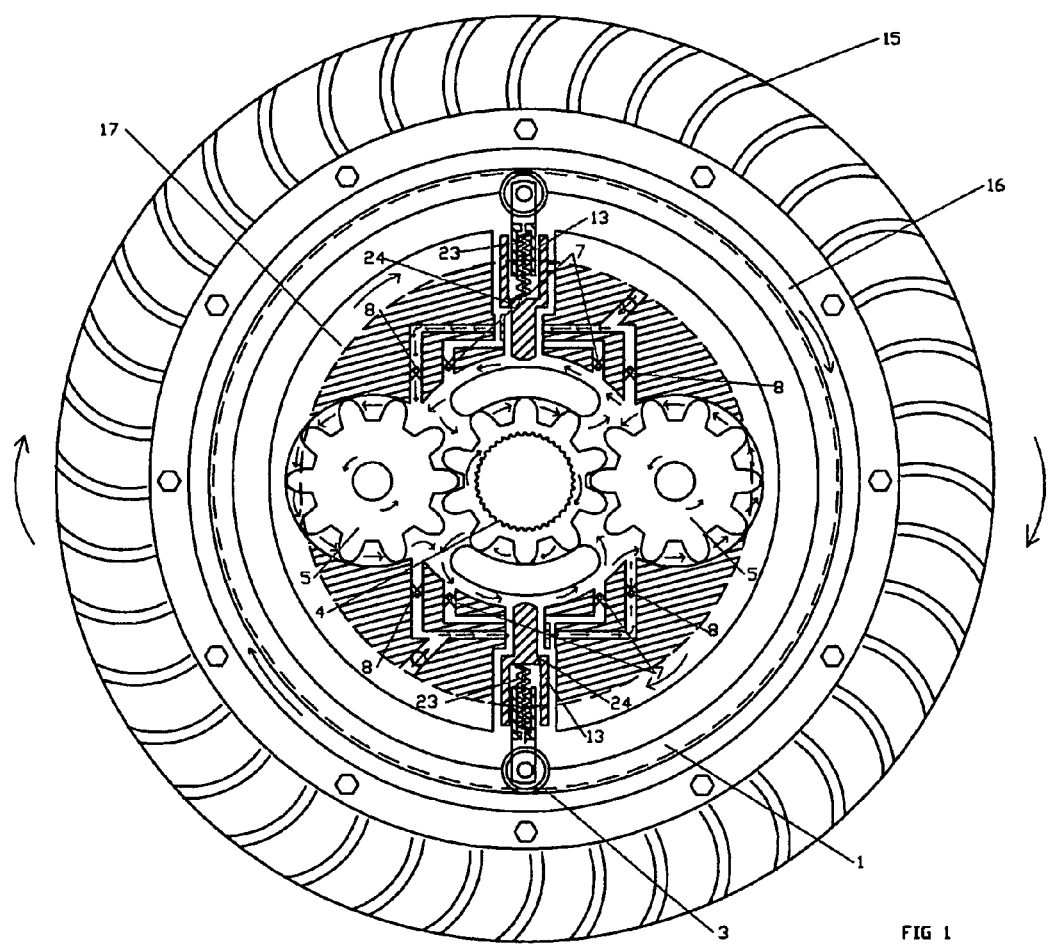

This application claims the benefit of PPA
Ser. No. 60/470, 930 filed May 15, 2003
Ser. No. 60/492, 487 filed Aug. 4, 2003

FEDERALLY SPONSORED RESEARCH not applicable

SEQUENCE LISTING OR PROGRAM not applicable

BACKGROUND OF THE INVENTION

This invention relates to any wheel driven vehicle or mobile equipment, more specifically to an improved method of controlling the differential or differentials of a vehicle.

To date limited-slip differentials, although having the benefits of increasing overall tractive effort of a vehicle in many conditions, primarily when one wheel contacts a surface with a lower coefficient of friction, also have some draw backs.

In the case of a standard limited-slip differential, when turning on dry pavement, while traction is not a concern, the friction that must be overcome between the clutch discs or the road surface and one or more of the vehicle wheels, causes strain and wear on drive-train components along with causing greater energy consumption required to overcome the friction.

In the case of a variable differential lock which uses the friction discs to create friction, the amount of locking force is not consistent due to the torque difference required to initially break the bond of the friction discs and the amount of torque required to maintain the slippage not to mention the associated wear to the friction discs.

The type of differential lock which uses the combination of friction discs that are compressed by the pumping action of an integral differential pump tend to give a "jerky" sensation when a wheel begins to spin and then locks. Other prior art using an integral pump with a fluid control device does not provide for any make-up or cooling fluid to automatically reenter the loop which makes them impractical.

All of these short comings of the prior art are overcome with closed-loop hydraulic adjustable slip differential. Component wear is minimized not eliminated, no high pressure rotating seals are used, the amount of "slip" can be tailored for conditions by operator or maximized when vehicle traction is not a concern there by requiring minimal power when turning.

FIELD OF INVENTION

This invention relates to an improved differential controlling device which has applications in but not restricted to passenger vehicles, construction and mining equipment and military vehicles.

OBJECTS AND ADVANTAGES

Accordingly several objects and advantages of my invention are the elimination of "wear" parts within a limited slip differential also giving the operator the ability to adjust the amount of differential "slip" from a maximum to some minimum while traveling at any speed while giving a smooth fluid feel as the locking action occurs within. Unseen internal workings of the differential further provide a method for flushing hot fluid from the mechanism while replenishing with cooling fluid.

SUMMARY

This invention is basically a limited slip differential, more specifically it is totally hydraulic actuated by use of an internal positive displacement pump which generates a quantity of fluid flow in proportion to the displacement of the pumping mechanism and the difference of rotation speed between the two half-axles. One or more fluid channels in the housing which contains positive displacement pump, direct fluid from the outlet back to the inlet of internal pump.

One or more adjustable fluid controls which are also contained within inner housing, will restrict the flow from the outlet of pump by some degree relative to the position maintained by vehicle operator of the internal control surface.

The pressure of the fluid generated by the internal pump and fluid control will be the force that to some degree attempts to lock differential axles together.

DRAWINGS

FIG. one is a view from the right hand side of the preferred embodiment of the internal positive displacement pump along with fluid controls, fluid channels and valves.

FIG. two is an elevation view in section of the entire apparatus.

REFERENCE NUMERALS 1) tapered control ring
3) tapered roller
4) sun gear
5) driven gear
7) regulating check valve
8) make-up fluid check valve
13) adjustable fluid control
15) ring gear
16) differential inner case
17) outer pump housing
18) annular cavity
19) left hand side gear
20) pinion gear
21) right hand side gear
22) annular manifold
23) spring
24) orifice

DETAILED DESCRIPTION

Preferred Embodiment

Figure 2:
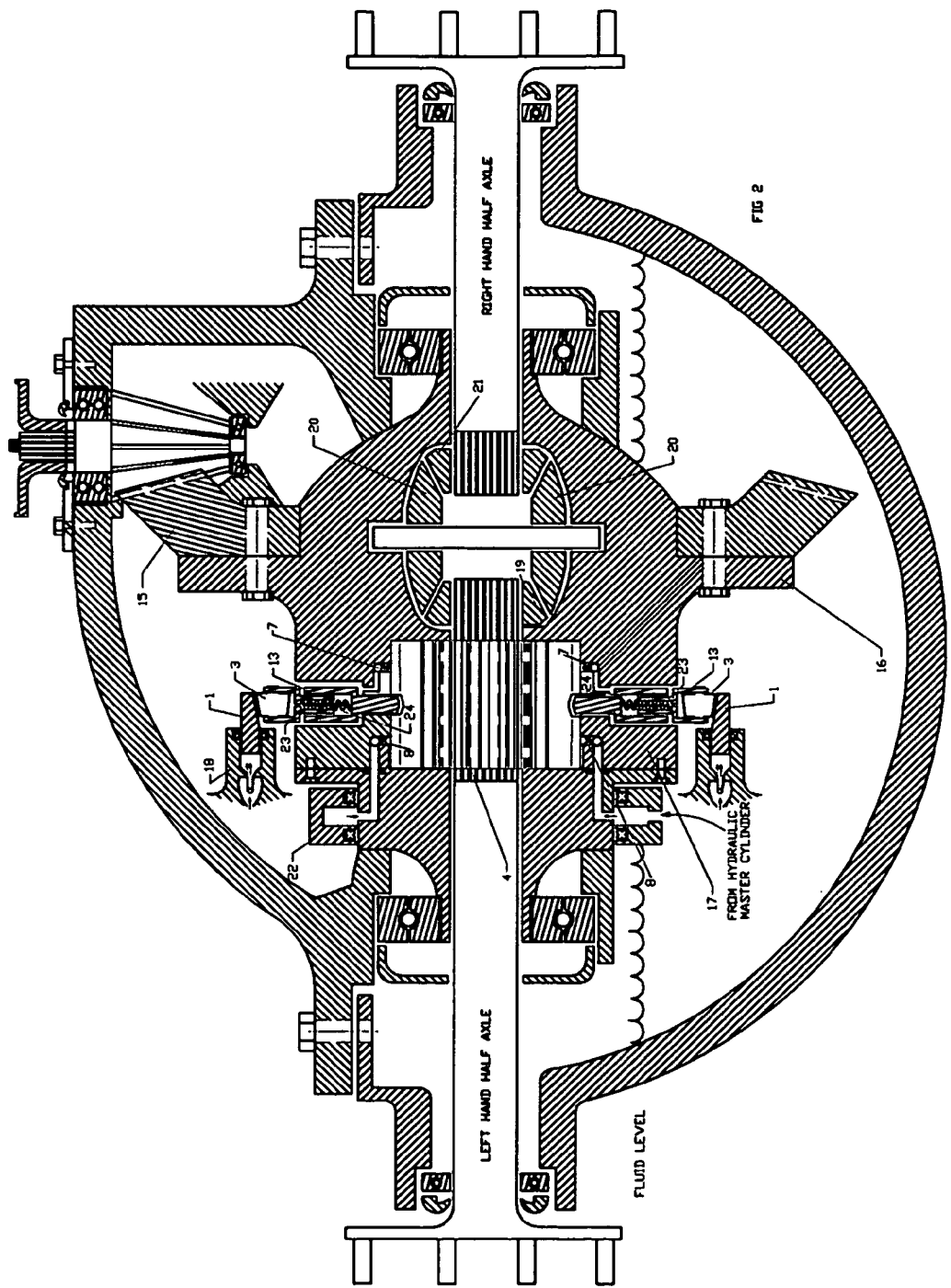

Illustrated in FIGS. 1 and 2 are sectional views of the preferred embodiment of the closed loop hydraulic, adjustable-slip differential where, ring gear 15 is fixed to differential inner case 16, also fixed to 15 and 16 is the outer housing of positive displacement gear pump 17. Left hand half-axle of vehicle is splined to sun gear 4 along with one side gear 19 (FIG. 2) of differential. Rotation of ring gear 15 would cause rotation of, differential case 16, applying rotational torque to differential side gears 19 and 21 (FIG. 2) by means of differential pinion gears 20 (FIG. 2). With half axles in place, rotation would be transmitted from side gears 20 (FIG. 2) to half-axles and also to sun gear 4. In the event that one half-axle would rotate, relative to the other half-axle, rotation of sun gear 4 and driven gears 5 would take place, causing a pumping action within pump housing 17. The moving fluid would be pushed past fluid controls 13, causing a differential pressure whereby the magnitude of the pressure would be dependent upon the quantity of flow and the amount of restricting of such flow.

The restriction of the flow would be controlled by the position of fluid control 13, position of fluid control 13 would be determined by position of control ring 1 (FIG. 1/FIG. 2) relative to roller 3 which is attached to body of fluid controls 13. The control ring 1, would be positioned and held by hydraulic pressure, where the control ring 1 would have a portion of its body without taper, some portion of which would be inserted and sealed in cavity 18 within outer housing, the hydraulic fluid within the cavity would be supplied from a master cylinder and the quantity would be predetermined by a programmed circuit controlling a stepper motor which in turn would rotate a lead screw driving a piston into the master cylinder, this would allow for predetermined steps for the amount of "slip" desired.

Some flushing of the closed hydraulic loop would be desirable, primarily to allow cool fluid in and hot fluid out, this would be achieved by orifice 24, which would be exposed to the higher pressure fluid within the loop. Fluid leaving the loop would have to be replaced within the loop, this would be accomplished by means of manifold 22 (FIG. 2), held from rotating and sealed to a portion of pump housing 17, where the cavity within manifold 22 would be simultaneously exposed to sump fluid at the lower portion of manifold, 22 along with porting leading to make up fluid check valves 8.

OPERATION OF INVENTION

FIGS. 1 and 2 are cutaway views of the preferred embodiment of the apparatus where ring gear 15 is fixed to differential inner case 16 which contains within pinion gears 20 and side gears 19 and 21. Right hand half axle is fixed to side gear 21 and left hand half axle is fixed to side gear 19 and sun gear 4. Outer housing of pump 17 is fixed to differential inner case 16 or manufactured as an integral part thereof. Detail 22 is the annular manifold which is sealed to pump outer housing 17, where the manifold would be fixed from rotating while allowing housing 17 to rotate within. Detail 18 would be the annular cavity which would be held within or manufactured as a part of differential outer housing where tapered control ring 1 is sealed to annular cavity 18, but allowed to move into or out of cavity dependent upon the amount of fluid held within cavity 18. Tapered roller 3, able to rotate on its axis while being attached to adjustable fluid control 13, shall rotate with fluid control 13, pump housing 17, differential inner case 16 and ring gear 15 while contacting a portion of the inside diameter of tapered control ring 1. The position of tapered control ring 1 shall determine the position of adjustable fluid control 13 which in turn determines the area of the restriction in the fluid passage way.

In an example of the typical operation of the apparatus, ring gear 15 would rotate clockwise (looking from end of right hand half axle) causing housing 16 to rotate along with pinion gears 20. Gears 20, being meshed with differential side gears 19 and 21 would also rotate causing right hand and left hand axle to rotate in the same direction as ring gear 15. When right hand axle requires less torque to rotate, pinion gears 20 will begin to spin on their axis which will allow left hand half axle to slow. As left hand half axle slows also does sun gear 4, as seen in FIG. 1, sun gear 4 is rotating clockwise but at a slower rate than ring gear 15, and housings 16 and 17. This causes driven gears 5 (FIG. 1) to spin on their axis's. With the spaces between gear teeth containing fluid, this fluid will be forced out of the spaces as driven gear teeth mesh with sun gear teeth. The displaced fluid would then be forced through passage which is metered by position of adjustable fluid control 13 where the amount of pressure drop across fluid controls 13 and displacement of gear set 4 and 5 would determine the amount of torque compelling the half axles to rotate at the same rate. As pressure builds across gear set and within internal passage, fluid will begin to pass through upper right and lower left regulating check valves 7 as viewed from FIG. 1. The exit side of check valves 7 is directed by channel to a surface of fluid controls 13 whereby pressure axis this surface will urge the metering portion of fluid controls 13 to move outward thereby compressing spring 23 to a point of equilibrium between fluid pressure and spring pressure. The area of the pressure sensing surface of fluid controls 13 is of predetermined quantity to react with the predetermined pressure/coefficient of spring 23. Along with a predetermined amount of travel of communicating member of fluid controls 13, pressure/coefficient of spring 23 and surface area of fluid control 13, a sensitivity and torque range are established to act upon the slip of the differential. Orifice 24 being of predetermined area allows a quantity of pressurized hot fluid to leave the internal loop through the body of fluid controls 13, this action not only lubricates fluid controls 13 and tapered roller 3 but also flushes heat from the circulating loop. As fluid leaves the loop, either through orifice 24 or through machining clearances, this will cause voids or low pressure within the gear set 4 and 5. This void or low pressure will then draw replenishing fluid up through the submerged portion of annular manifold 22 (FIG. 2) then on through passages within housing 17 then finally through one or more check valves 8 and back into the gear set.

CONCLUSION, RAMIFICATIONS AND SCOPE OF INVENTION

Many of the internal workings of the invention may be accomplished by other similar means, for instance, the pumping mechanism may be a gerotor or piston type pump, and also one or more driven gears could be used depending on the required torque. The restricted passages for allowing fluid to leave the loop could be somewhere other than in the fluid controls or there could be none except that some machining tolerances could be large enough to allow sufficient fluid to escape. The adjustable fluid controls could be constructed as floating flow controls. The make-up fluid could be supplied through the annular manifold by a separate pump. Another possible way of positioning the tapered control ring could be external threads on control ring which would mate with internal threads within the carrier housing where rotation of tapered control ring would cause the ring 1 to move toward or away from tapered roller 3. The ring gear 15 could be a sprocket, pulley or some other drive mechanism, thus the scope of the invention should be determined by the appended claims and their legal equivalents rather than by the examples given.

What is claimed is:

1. A vehicle differential comprising an outer housing containing within a rotatably mounted inner case which is in mechanical communication with means for causing rotation of the inner case within the outer housing, the inner case containing within differential gears comprising at least two rotatably mounted side gears in mechanical communication with at least one pinion gear simultaneously, where said pinion gear is also rotatably mounted within said inner case and mechanically compelled to rotate radially with said inner case also within said inner case a positive displacement hydraulic pump where at least one rotating or oscillating member of said pump will be in mechanical communication with one of the two said side gears and, an other pump member which in conjunction with said first member would cause the pumping action, shall be mechanically attached to move with said inner case or other side gear, within said inner case at least one channel for directing fluid from outlet of said pump to inlet, a variable fluid controlling means contained within said inner case intersecting said channel where a slidingly mounted communicating member will protrude radially from said inner case to be in communication with said variable controlling means simultaneously interfacing a control surface which is slidingly mounted to said outer housing, in conjunction with said control surface, a means for positioning and maintaining position of said control surface, also a means for allowing a predetermined quantity of fluid which is pressurized by said pump to leave the fluid loop within said inner case and a means for supplying make up fluid back into said fluid loop, a pair of shafts or axles rotatably mounted to said outer housing while protruding into said inner case at centerline of axis of rotation, each from opposite sides engaging one said side gear each.

2. The vehicle differential of claim 1 wherein said pump would be a gear type pump.

3. The vehicle differential of claim 1 wherein said fluid controlling means would be a variable relief valve.

4. The vehicle differential of claim 1 wherein said communicating member shall be a portion of a body of said relief valve.

5. The vehicle differential of claim 4, wherein the body portion of said relief valve further includes a rotatably mounted tapered roller at the outer tip.

6. The vehicle differential of claim 1 wherein said control surface shall be an annular ring.

7. The vehicle differential of claim 6, wherein the annular ring comprises a portion of an inner surface shall be tapered.

8. The vehicle differential of claim 6, wherein the annular ring comprises a portion of the inside diameter and outside diameter which are parallel is sealingly and slidingly contained within an annular cavity formed within said outer housing.

9. The vehicle differential of claim 1, wherein the outer housing further includes an annular cavity.

10. The vehicle differential of claim 1, wherein the positioning means further comprises a hydraulic master cylinder.

* * * * *